United States Patent
Bayha et al.

(10) Patent No.: US 9,606,222 B2
(45) Date of Patent: Mar. 28, 2017

(54) OPTOELECTRONIC SENSOR DEVICE, IN PARTICULAR LASER SCANNER, HAVING AN ADAPTED RECEIVING UNIT FOR OPTIMIZED REDUCTION OF THE RECEPTION LEVEL

(71) Applicant: VALEO Schalter und Sensoren GmbH, Bietigheim-Bissingen (DE)

(72) Inventors: Heiner Bayha, Satow ot Clausdorf (DE); Peter Horvath, Vaihingen a. d. Enz (DE); Jens Nicolai, Neupetershain (DE)

(73) Assignee: VALEO Schalter und Sensoren GmbH, Bietigheim-Bissingen (DE)

( * ) Notice: Subject to any disclaimer, the term of this patent is extended or adjusted under 35 U.S.C. 154(b) by 50 days.

(21) Appl. No.: 14/390,508

(22) PCT Filed: Mar. 22, 2013

(86) PCT No.: PCT/EP2013/056032
§ 371 (c)(1),
(2) Date: Oct. 3, 2014

(87) PCT Pub. No.: WO2013/149852
PCT Pub. Date: Oct. 10, 2013

(65) Prior Publication Data
US 2015/0177368 A1    Jun. 25, 2015

(30) Foreign Application Priority Data
Apr. 4, 2012   (DE) .................. 10 2012 006 869

(51) Int. Cl.
*G01C 3/08*      (2006.01)
*G01S 7/481*     (2006.01)
(Continued)

(52) U.S. Cl.
CPC .......... *G01S 7/4816* (2013.01); *G01S 7/4868* (2013.01); *G01S 17/026* (2013.01); *G01S 17/08* (2013.01)

(58) Field of Classification Search
CPC .... G01S 7/4816; G01S 7/4868; G01S 17/026; G01S 17/08
See application file for complete search history.

(56) References Cited

U.S. PATENT DOCUMENTS

| 5,233,382 A | 8/1993 | Taniguchi et al. |
| 5,825,473 A | 10/1998 | Kodaira |

(Continued)

FOREIGN PATENT DOCUMENTS

| DE | 29 913 513 U1 | 11/1999 |
| DE | 100 26 668 A1 | 12/2001 |

(Continued)

OTHER PUBLICATIONS

Notification of Reason for Rejection issued in corresponding Japanese Application No. 2015-503815, mailed Oct. 16, 2015 (7 pages).

(Continued)

*Primary Examiner* — Luke Ratcliffe
*Assistant Examiner* — Samantha K Abraham
(74) *Attorney, Agent, or Firm* — Osha Liang LLP

(57) ABSTRACT

The invention relates to an optoelectronic sensor device (1) for a motor vehicle, for detecting objects located in the surroundings of the motor vehicle, having a transmitting unit (2) for emitting an optical transmission signal (5), having a receiving unit (7) for receiving a reception signal (8) which is the transmission signal (5) reflected by an object, wherein the receiving unit (7) has at least two receiving elements (9, 10, 11) which are arranged distributed along a distribution direction (12), and reception optics (13), in particular a receiving lens which is positioned ahead of the receiving (Continued)

elements (9, 10, 11) in the propagation direction (14) of the reception signal (8), having a securing device (22) for securing the receiving optics (13), and having a diaphragm (21, 21') for reducing the intensity of the reception signal (8), wherein the diaphragm (21, 21') is secured to the securing device (22).

10 Claims, 3 Drawing Sheets

(51) Int. Cl.
    *G01S 7/486* (2006.01)
    *G01S 17/02* (2006.01)
    *G01S 17/08* (2006.01)

(56) References Cited

U.S. PATENT DOCUMENTS

| | | | |
|---|---|---|---|
| 2003/0128351 A1 | 7/2003 | Schmidt et al. | |
| 2006/0028071 A1* | 2/2006 | Chang | G02B 5/005 310/12.25 |
| 2006/0098895 A1* | 5/2006 | Westphal | G02B 21/125 382/274 |
| 2007/0297175 A1* | 12/2007 | Glent-Madsen | G02B 26/04 362/282 |
| 2011/0164297 A1* | 7/2011 | Abe | C23C 14/0015 359/227 |

FOREIGN PATENT DOCUMENTS

| | | |
|---|---|---|
| DE | 101 43 060 A1 | 3/2003 |
| EP | 1 300 715 A2 | 4/2003 |
| EP | 2 071 358 A2 | 6/2009 |
| JP | H05-303032 A | 11/1993 |
| JP | H07-332969 | 12/1995 |
| JP | H10-239050 A | 9/1998 |
| JP | 2004-521355 A | 7/2004 |
| WO | 03/002939 A1 | 1/2003 |

OTHER PUBLICATIONS

Notice of Preliminary Rejection issued in corresponding Korean Application No. 2014-7030812, dated Nov. 25, 2015 (10 pages).

First Office Action issued in corresponding Chinese Application No. 201380024704.6, dated Oct. 8, 2015 (13 pages).

International Search Report issued in PCT/EP2013/056032 mailed on May 21, 2013 (4 pages).

German Search Report issued in 10 2012 006 869.7 mailed on Oct. 2, 2012 (5 pages).

* cited by examiner

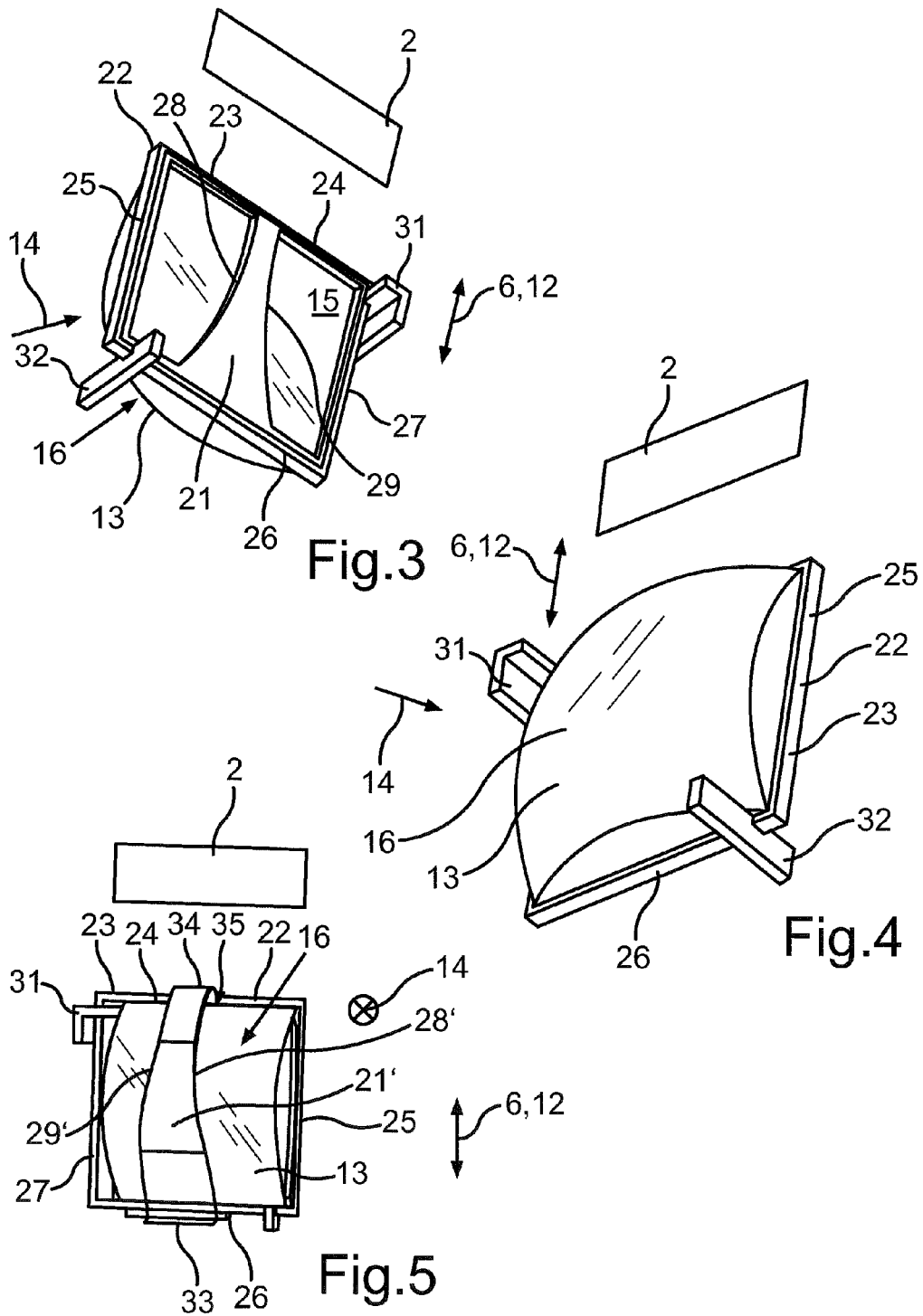

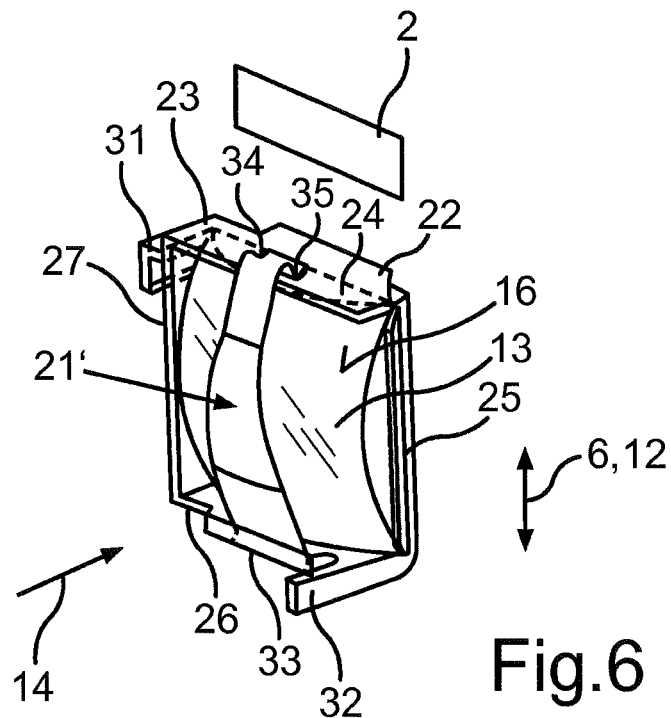
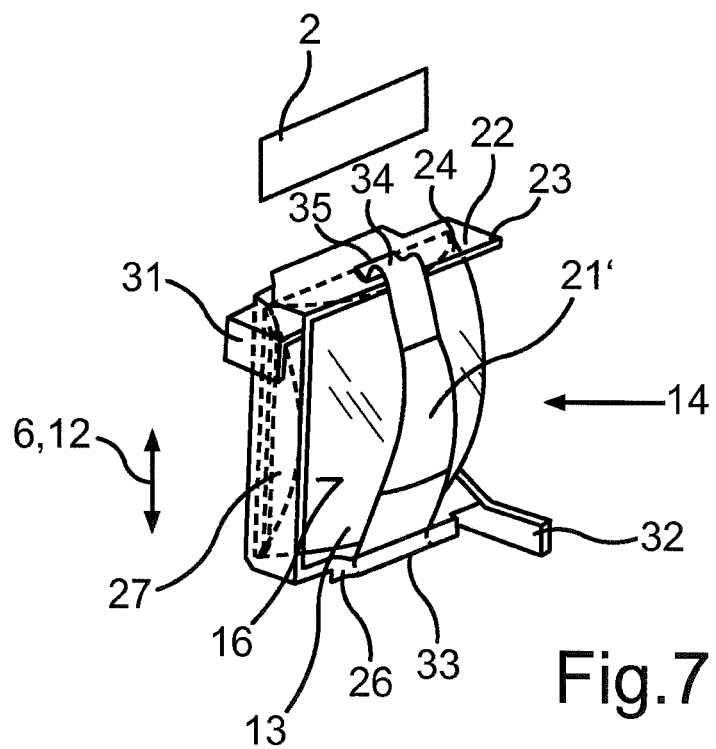

OPTOELECTRONIC SENSOR DEVICE, IN PARTICULAR LASER SCANNER, HAVING AN ADAPTED RECEIVING UNIT FOR OPTIMIZED REDUCTION OF THE RECEPTION LEVEL

The invention relates to an optoelectronic sensor device, in particular a laser scanner or a lidar device, for a motor vehicle, which sensor device is designed to detect objects located in the surrounding of the motor vehicle. The sensor device comprises a transmitting unit for emitting an optical transmission signal or a transmission light beam, as well as a receiving unit for receiving a reception signal, which is the transmission signal reflected by an object. The receiving unit has at least two receiving elements (for example photo diodes) which are arranged distributed along a distribution direction. The receiving unit also comprises receiving optics, in particular a receiving lens, which is positioned ahead of the receiving elements in the propagation direction of the reception signal and serves, for example, to focus the reception signal on the receiving elements. The sensor device also comprises a securing device for securing the receiving optics, as well as a diaphragm for reducing the intensity of the reception signal. The invention also relates to a motor vehicle having such an optoelectronic sensor device.

The interest here is in particular in a laser scanner. Such sensor devices are already known from the prior art and are attached, for example, to motor vehicles in order to detect the surroundings of the motor vehicle during travel or during operation of the motor vehicle. These are scanning optical measuring devices for detecting objects or obstacles in the area surrounding the motor vehicle which measure the distance between the motor vehicle and the objects according to the light pulse propagation time method. Such a laser scanner can be inferred as being known, for example, from document DE 101 43 060 A1. A transmitting unit, including, for example, a laser diode, emits a light beam which is then reflected at an object located in the surroundings of the motor vehicle and in the form of a reception signal or reception light beam reaches a receiving unit of the laser scanner. The receiving unit usually includes a plurality of identical photodiodes as receiving elements, in particular what are referred to as avalanche photodiodes, which are arranged distributed in a straight line. In order to achieve correct resolution of the detected objects, as a rule at least three or four such photodiodes are required, which are distributed in the vertical direction of the vehicle, that is to say one above the other. In this way, a certain depth can be achieved in a way comparable with a 3D recording, which permits an object such as, for example, another vehicle to be differentiated from the grey background.

The light beam which is output by the transmitter is swung in the vertical direction and, if appropriate, also in the horizontal direction usually using a suitable deflection device, for example a mirror element, with the result that the surroundings of the motor vehicle are, as it were, scanned. The transmitting unit is located here, for example, above the specified photodiodes, which are arranged distributed in the vertical direction together with the transmitting unit. This consequently leads to the situation on that, although the photodiodes are of identical design in physical terms, these photodiodes "see" the detected objects with a chronological offset, and therefore the intensity of the receiving signal at each photodiode is also different. This distribution of the light intensity at the photodiodes depends in turn directly on the arrangement thereof relative to the transmitting unit which, as already stated, is located above the photodiodes. In order then to avoid over-modulation of the photodiodes or in order to reduce the reception sensitivity and therefore also to prevent "blindness" of the laser scanner for a certain time, in the prior art a light-impermeable, mostly black stripe is painted on to the receiving lens or a corresponding adhesive strip is bonded onto the lens. However, this has the disadvantage that such an application of a coat of paint or a corresponding adhesive strip is relatively costly and furthermore also time-consuming, in particular in the case of lenses made of plastic.

The object of the invention is to specify a solution as to how the expenditure on the provision of the diaphragm in a sensor device of the generic type mentioned at the beginning can be reduced compared to the prior art.

This object is achieved according to the invention by means of an optoelectronic sensor device and by means of a motor vehicle having the features according to the respective independent patent claims. Advantageous embodiments of the invention are the subject matter of the dependent patent claims, of the description and of the figures.

An optoelectronic sensor device according to the invention for a motor vehicle is designed to detect objects which are located in the surroundings of the motor vehicle, specifically in particular to measure a distance between an object and the motor vehicle. The sensor device includes a transmitting unit which is designed to emit an optical transmission signal or a transmission light beam. The sensor device also comprises a receiving unit which is designed to receive a reception signal which is the transmission signal reflected by an object. The receiving unit has at least two receiving elements which are arranged distributed along a distribution direction, such as receiving optics, in particular a receiving lens, which is arranged ahead of the receiving elements in the propagation direction of the reception signal, and is therefore located in a reception path or in the propagation path of the reception signal. The sensor device also has a securing device which is designed to secure the receiving optics, and a diaphragm which is designed to reduce the intensity of the reception signal. According to the invention there is provision for the diaphragm to be secured to the securing device.

Instead of placing a corresponding coat of paint or else a bonding strip as a diaphragm on the receiving optics, it is therefore proposed that for the purpose of defined reduction of the light intensity the diaphragm is secured directly to the securing device or supported by this securing device, with the result that after the receiving optics are removed from the securing device the diaphragm can remain on the securing device. This has the advantage that the diaphragm can therefore be made available with minimum expenditure; the diaphragm can, for example, even be embodied in one piece with the securing device for the receiving optics or can be attached as a stand-alone element to the securing device or connected to the securing device, in particular by means of a latching connection or the like. It is in fact no longer necessary to provide an additional adhesive strip or a layer of paint separately to the receiving optics in an additional mounting step, with the result that this mounting step, with the associated disadvantages in terms of time and also in terms of costs, is eliminated. It is therefore also possible to use receiving lenses made of plastic in which the application of a layer of paint or of an adhesive strip is possible only with particularly large expenditure. A further advantage of the sensor device according to the invention is that a specific geometry of the receiving optics, in particular a specific lens geometry, can also be combined with various different securing devices. Furthermore, it is also possible to equip different sensor devices for different installation locations with different securing devices or with different diaphragms in accordance with the desired sensitivity scenarios. Consequently, significantly greater flexibility in terms of the configuration of the sensor device is obtained than in the case of a diaphragm which is embodied in the form of a layer of paint or of an adhesive strip.

The optoelectronic sensor device is preferably a laser scanner or else a lidar device (light detection and ranging).

The diaphragm is preferably a positionally fixed element which is fixed, and therefore immobile during operation, and which is arranged in the reception path, that is to say in the propagation path of the reception signal.

The diaphragm can basically be positioned ahead of the receiving optics. Alternatively, it is however also possible to provide that the diaphragm is arranged behind the receiving optics in the propagation direction of the reception signal.

The transmission signal is in particular a transmission light beam which can preferably be swung, to be precise, in particular, can be swung in a swinging direction which coincides with the distribution direction of the receiving elements, in particular with the vertical direction. For this purpose, for example a mobile deflection element, for example a mirror element, can be provided such as is described, for example, in document DE 101 43 060 A1.

The receiving elements are preferably photodiodes, in particular avalanche photodiodes.

Preferably at least three such receiving elements are provided. It is possible to provide, for example, that the sensor device has two or three or four or five receiving elements. In one embodiment, the receiving unit includes four photodiodes.

The at least three receiving elements are preferably arranged distributed along a straight line or lie on a common virtual straight line which runs in the distribution direction of the receiving elements. The receiving elements are preferably also arranged distributed equidistantly.

In the installed state of the sensor device, the transmitting unit is preferably located above the receiving unit. It is also possible to provide in one embodiment that the transmitting unit, that is to say at least one diode of the transmitting unit, lies on a common straight line with the receiving elements, specifically, in particular, on the vertical line.

The transmitting unit preferably comprises a transmitting diode, to be precise, in particular, a laser diode which is designed to emit the optical transmission signal.

The diaphragm is preferably formed from an aluminium alloy. Alternatively it is also possible to provide that the diaphragm is produced from plastic. Correspondingly, the securing device can also be formed from an aluminium alloy or else from plastic. It is preferred if the diaphragm is formed from the same material as the securing device. The specific materials permit here low-expenditure attachment of the securing device and of the diaphragm in a housing of the sensor device. It is particularly preferred if the material of the securing device corresponds to the material of a housing part to which the securing device is attached. This housing part can be, for example, a securing plate for the securing device. By means of identical materials it is possible to prevent that owing to different coefficients of expansion in the case of changes of temperature the set or adjusted position of the receiving optics is shifted during operation of the sensor device.

In one embodiment there is provision that the diaphragm is an inherently rigid element. It is therefore possible for a particularly stable arrangement of the diaphragm on the securing device to be enabled, which arrangement, furthermore, also ensures that there is a particularly precise and defined reduction in the intensity of the reception signal. Furthermore, it is therefore also ensured that the diaphragm can also have additional functions such as, for example, securing of the receiving optics.

In one embodiment it is possible to provide that the diaphragm is embodied in one piece with the securing device. The diaphragm is therefore, as it were, a component of the securing device and can even support the securing of the receiving optics. Furthermore, particularly high stability of the entire arrangement is thus ensured, and a situation is prevented in which the position of the diaphragm with respect to the securing device and therefore also with respect to the receiving optics can change somewhat owing to forces acting on the sensor device during the operation of the motor vehicle. Therefore, a constant position of the diaphragm with respect to the receiving optics is continuously ensured, and therefore a continuously constant effect of the diaphragm is also ensured.

Alternatively, the diaphragm can also be a stand-alone element which is connected to the securing device.

The diaphragm can also preferably have a securing function for the receiving optics, with the result that the receiving optics is secured at least in a supportive fashion by the diaphragm. The diaphragm therefore performs two different functions, specifically, on the one hand, the function of reducing the light intensity and, on the other hand, also the function of securing the receiving optics. As a result of such a double functionality of the diaphragm, there can be a saving in both costs and valuable installation space.

It is particularly preferred if the diaphragm is of elongate design, with the result that it is made available in the form of an elongated element which extends along the distribution direction of the receiving elements. It is then possible to obtain a different intensity of the reception signal for the respective receiving elements. This embodiment is based on the realization that the intensity of the incident reception signal at each receiving element is different, specifically as a function of the distance between the respective receiving element and the transmitting unit.

The diaphragm is preferably a flat element which lies essentially in a plane which is oriented perpendicularly with respect to the propagation direction of the reception signal, and therefore parallel to the plane of the receiving optics.

It is also preferred if the diaphragm tapers in the distribution direction of the receiving elements. In particular there is provision here that the diaphragm is designed to taper in the direction of a receiving element which is positioned closest with respect to the transmitting unit. This embodiment builds on the realization that the intensity of the incident reception signal at the receiving element which is located furthest from the transmitting unit is greater than the light intensity at a receiving element which is located closer to the transmitting unit. The receiving element which is located furthest away is therefore also subjected to the maximum light intensity. According to this embodiment, this can be compensated in that the diaphragm is designed to taper in the direction of the transmitting unit, with the result that it can be achieved that each receiving element is subjected approximately to the same light intensity. Overmodulation of individual receiving elements is therefore prevented.

The diaphragm is preferably embodied in the manner of a trapezium whose limbs can be straight or else curved. If a curved configuration of the respective limbs is selected, it proves advantageous if these limbs are embodied concavely in the direction of one another. A tapered shape of the diaphragm can therefore be realized without a large amount of expenditure.

The diaphragm is preferably arranged centrally in relation to the receiving optics in the perpendicular direction with respect to the distribution direction of the receiving elements. This means that the diaphragm can be arranged in a mirror-symmetrical fashion in relation to a central axis or an axis of symmetry of the receiving optics. The intensity of the reception signal can therefore be effectively reduced.

In one embodiment there is provision that the diaphragm is formed from a material which is non-transparent with respect to the optical reception signal. However, in order to achieve a defined reduction of the light intensity it is also possible to provide that the material of the diaphragm has a defined partial transparency.

In respect of the configuration of the securing device, in one embodiment there is provision that the securing device has a frame for holding the receiving optics, and the diaphragm, in particular an elongated element, spans or bridges two opposite sides of the frame. In addition to a reliable reduction in the light intensity, it is therefore also additionally possible to permit a particularly stable arrangement of the receiving optics on the frame because the diaphragm can also serve here at least to support the receiving optics. Two different embodiments can then be provided:

The diaphragm can be located in a common plane with the sides of the frame, and the receiving optics can be made to abut with the diaphragm. In this embodiment, the diaphragm is preferably embodied in one piece with the frame and therefore forms a component of the frame itself as well as serving as a support surface for an, in particular planar, rear side of the receiving optics. In this embodiment, the receiving optics can be connected to the frame via, for example, a bonded connection and/or a latched connection and/or a clipped connection.

However, it can also alternatively be provided that the diaphragm is embodied as a spring element which presses the receiving optics against the frame. This embodiment has the advantage that the diaphragm therefore performs an additional securing function and therefore also serves to attach the receiving optics to the frame. The spring element can be connected here to the frame via, for example, a clipped connection and/or a latched connection. However, it is also possible to provide that the spring element is also embodied in one piece with the frame. The spring element is therefore preferably located on one side of the receiving optics which faces away from the receiving elements. This side of the receiving optics is preferably that side which is embodied in a belly-like or curved fashion.

The receiving optics are preferably a receiving lens which is preferably designed to focus the reception signal onto the individual receiving elements. The receiving optics can have a square shape in cross section. The receiving optics preferably have a first side which is planar and which faces the receiving elements, and a second side which is of curved design and faces away from the receiving elements.

A motor vehicle according to the invention comprises an optoelectronic sensor device according to the invention. The preferred embodiments which are presented with respect to the sensor device according to the invention, and the advantages of said embodiments, apply correspondingly to the motor vehicle according to the invention.

Further features of the invention can be found in the claims, the figures and the description of the figures. All the features and combinations of features specified above in the description as well as the features and combinations of features which are specified below in the description of the figures and/or shown solely in the figures can be used not only in the respectively disclosed combination but also in other combinations or else alone.

The invention will now be explained in more detail on the basis of individual preferred exemplary embodiments as well as with reference to the appended drawings. It is emphasized that the exemplary embodiments described below constitute only preferred embodiments of the invention and the invention is therefore not restricted to the following exemplary embodiments.

In the drawings:

FIGS. 3 and 4 are a schematic and perspective illustration of the securing device with the receiving optics according to FIG. 2; and FIGS. 5 to 7 are a schematic illustration of a securing device, of receiving optics as well as of a diaphragm according to another embodiment of the invention.

Figure 1:
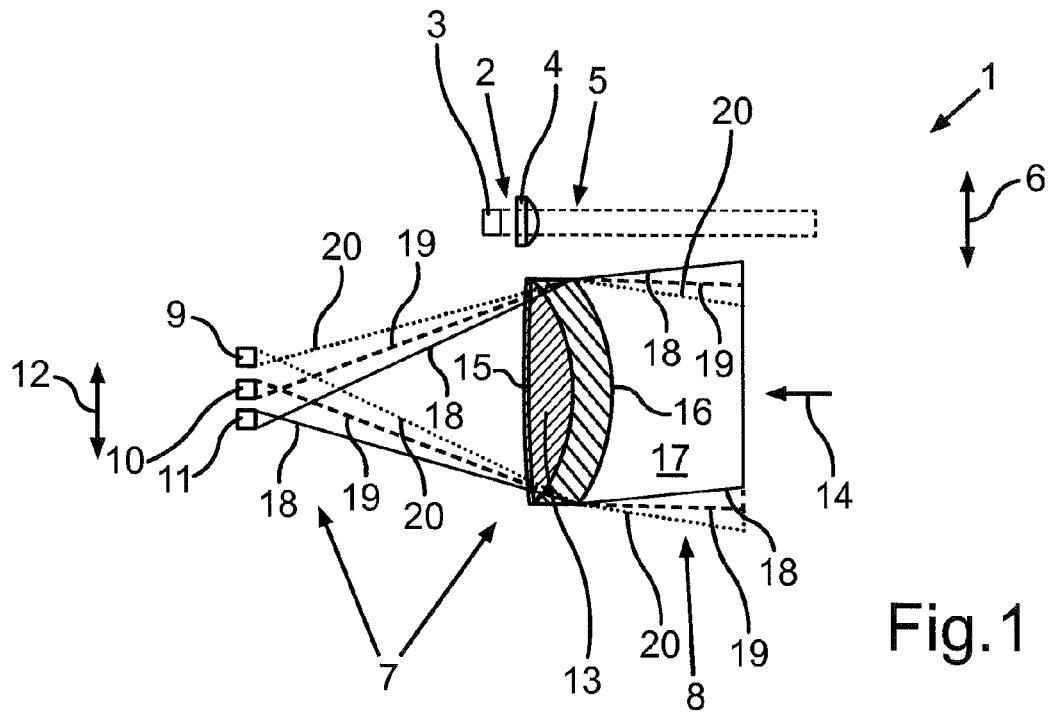
FIG. 1 is a schematic illustration of an optoelectronic sensor device according to an embodiment of the invention.

A sensor device 1 which is illustrated only schematically in FIG. 1 is, for example, a laser scanner or else a lidar device. The sensor device 1 can be used in a motor vehicle and serves to detect objects in an area surrounding the motor vehicle and, in particular, also to measure distances between the motor vehicle, on the one hand, and the objects located in its surroundings, on the other. The sensor device 1 can be mounted, for example, on a bumper or behind a windscreen or else on a side edge.

The sensor device 1 includes a transmitting unit 2 which has a transmitting diode 3 which is a laser diode in the exemplary embodiment. Transmitting optics 4, specifically, for example, a lens, also form part of the transmitting unit 2. The transmitting unit 2 emits an optical transmission signal 5, that is to say a transmission light beam in the form of a laser beam.

The transmission signal 5 and the laser beam are then swung in the vertical direction 6 by means of a suitable deflection device, and, for example, also deflected, as is already described, for example, in document DE 101 43 060 A1.

In the installed state of the sensor device 1, the transmitting unit 2 is (when viewed in the vertical direction of the vehicle) located above a receiving unit 7 which serves to receive a reception signal 8. This reception signal 8 is basically the transmission signal 5 reflected by an object. The transmission signal 5 is therefore reflected at an object in the surroundings of the motor vehicle and then passes back in the form of the reception signal 8 to the sensor device 1. The receiving unit 7 includes, on the one hand, a multiplicity of receiving elements, specifically three receiving elements 9, 10, 11 in the exemplary embodiment. The receiving elements 9, 10, 11 in the exemplary embodiment are photodiodes, specifically in particular what are referred to as avalanche photodiodes. The receiving elements 9, 10, 11 are arranged distributed along a distribution direction 12 which coincides with the vertical direction 6. The receiving elements 9, 10, 11 lie here on a common virtual straight line, specifically here on a common vertical.

The receiving unit 7 also includes, on the other hand, receiving optics 13 which are embodied here as a receiving lens. In the propagation direction 14 of the reception signal 8, the receiving optics 13 are located ahead of the receiving elements 9, 10, 11, with the result that these receiving optics 13 are positioned ahead of the receiving elements 9, 10, 11. The receiving optics 13 have a planar rear side 15 which faces the receiving elements 9, 10, 11, and a curved front side 16 which faces away from the receiving elements 9, 10, 11 and points counter to the propagation direction 14. The receiving optics 13 are therefore located in a reception path 17 which is a propagation path of the reception signal 8.

As already stated, the transmission signal 5 is swung at least in the vertical direction 6 (can also be in the horizontal direction), with the result that the receiving elements 9, 10, 11 receive the reception signal 8 at different times. To be precise, the receiving element 11 which is located furthest away from the transmitting unit 2 receives a reception light beam 18, while the middle receiving element 10 receives a reception light beam 19 at another time, and the receiving element 9 which is positioned closest to the transmitting unit 2 receives a further reception light beam 20 at yet another time. It has been shown that that reception light beam 18 which is received by the receiving element 11 and is furthest away from the transmitting unit 2 has the greatest intensity. Furthermore, the intensity of the reception signal 8 is also dependent on the distance between the detected object and the sensor device 1. In order then to avoid dazzling or over-modulation of the individual receiving elements 9, 10, 11, it is proposed to use a diaphragm 21 (see the further figures) by means of which the intensity of the received reception light beams 18, 19, 20 is reduced, specifically in each case to a different degree for the receiving elements 9, 10, 11.

Figure 2:
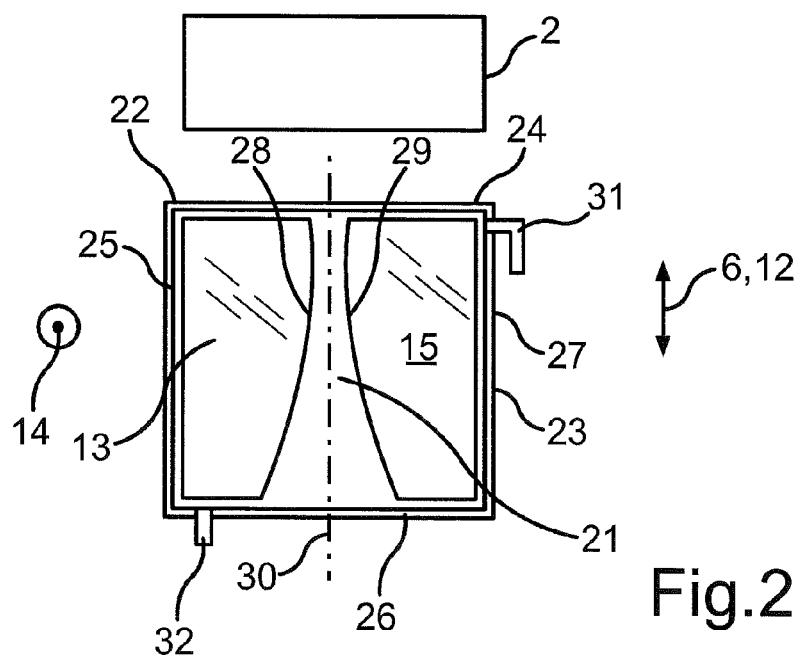
FIG. 2 is a schematic illustration of the rear side of a securing device and of receiving optics, wherein the position of a transmitting unit is indicated.

FIG. 2 illustrates, according to a first embodiment of the invention, a securing device 22 which is designed to secure the receiving optics 13 in the reception path 14. The receiving optics 13 are therefore held in a setpoint position by means of the securing device 22, wherein the planar rear side 15 of the receiving optics 13, that is to say that side which faces the receiving elements 9, 10, 11, is illustrated in FIG. 2. For the purpose of orientation, the position of the transmitting unit 2 is also illustrated schematically in FIG. 2, as is also the propagation direction 14 of the reception signal 8 (perpendicular to the plane of the drawing) and the distribution direction 12 and the vertical direction 6.

In the exemplary embodiment according to FIG. 2, the securing device 22 is formed by a frame 23 which constitutes a mount in which the receiving optics 13 are held with their planar rear side 15. The receiving optics 13 can be attached in the frame 23, for example by means of a bonded connection and/or a latched connection. A plane which is defined by the frame 23 lies perpendicularly with respect to the propagation direction 14 here. The receiving optics 13 therefore lie within the frame 23 and are therefore directly enclosed or surrounded on their outer circumference by a total of four sides 24, 25, 26, 27 of the frame 23. As is also apparent from FIG. 2, the frame 23 is a square frame and is therefore adapted to the square shape of the receiving optics 13.

In the exemplary embodiment according to FIG. 2, the above-mentioned diaphragm 21 is formed in one piece with the frame 23 and extends between two sides 24, 26, lying opposite, of the frame 23, with the result that the diaphragm 21 bridges or spans the two opposite sides 24, 26 (that is to say the lower and the upper side) of the frame 23. The plane of the diaphragm 21 lies here perpendicularly with respect to the propagation direction 14 and therefore coincides with the plane of the frame 23. The diaphragm 21 lies accordingly in a common plane with all the sides 24 to 27 of the frame 23 and therefore forms a support for the rear side 15 of the receiving optics 13. The diaphragm 21 is also an elongated element which extends in the distribution direction 6 and is also arranged in the propagation direction 14 in an overlapping arrangement with the receiving elements 9, 10, 11. The diaphragm 21 is also designed to taper in the direction of the transmitting unit 2, with the result that the width of the diaphragm 21 continuously or constantly decreases in a perpendicular direction with respect to the propagation direction 14 as well as with respect to the distribution direction 6. Although the diaphragm 21 which is formed in the manner of a trapezium has curved limbs 28, 29 in FIG. 2, these limbs 28, 29 can basically also be of linear design. This depends essentially on what reduction in the intensity of the respective reception light paths 18, 19, 20 is to be achieved.

The diaphragm 21 also extends centrally along an axis 30 of symmetry of the receiving optics 13 which in turn runs in the vertical direction 6 or along the distribution direction 12.

The entire frame 23 including the diaphragm 21 can be formed, for example, from plastic or else from an aluminium alloy. Consequently, the diaphragm 21 as well as the frame 23 are inherently rigid elements.

FIGS. 3 and 4 each illustrate a perspective illustration of the frame 23 and of the receiving optics 13 according to FIG. 2, wherein in addition the position of the transmitting unit 2 is also indicated. As is apparent from FIGS. 2 to 4, adjustment elements 31, 32 are also associated with the securing device 22, which adjustment elements constitute guides for adjustment of the frame 23 or of the receiving optics 13. In a calibration phase, the receiving optics 13 can in fact be moved along the propagation direction 14 and along the adjustment elements 31, 32 into the optimum position with respect to the receiving elements 9, 10, 11.

As is illustrated in FIGS. 2 to 4, the diaphragm 21 can be arranged on the rear side of the receiving optics 13, with the result that the receiving optics 13 bear with their rear side 15 on the diaphragm 21. However, it is also possible to provide that, additionally or alternatively, a diaphragm 21' is arranged on the front side 16 of the receiving optics 13. Such an embodiment is illustrated in FIGS. 5 to 7. This embodiment corresponds essentially and, in particular in its function, to the embodiment according to FIGS. 2 to 4, with the result that only differences between the two are explained in more detail below. In the perspective illustration shown in FIG. 5, the receiving elements 9, 10, 11 are located behind the receiving optics 13, that is to say behind the plane of the drawing. The diaphragm 21' is embodied here as a spring element by means of which the receiving optics 13 are clamped to the frame 23 with a spring force. In other words, the diaphragm 21' presses the receiving optics 13 against the mount or against the frame 23, with the result that the receiving optics 13 are secured or attached to the frame 23 by means of the spring force. The diaphragm 21' can be attached here to the frame 23 using, for example, a latched connection. In this context, the diaphragm 21' can firstly be held by its free end 33 in a recess in the lower side 26 of the frame 23 and then swung in the direction of the receiving optics 13 until a latching element 35 which is formed on the opposite end 34 latches into a corresponding latching opening in the upper side 24 of the frame 23.

However, it can alternatively also be provided that the diaphragm 21' is also embodied in one piece with the frame 23 or else alternatively is connected to the frame 23 using a bonded connection.

In a projection viewed in the propagation direction 14, the diaphragm 21' has essentially the same shape as the diaphragm 21 according to FIGS. 2 to 4. The function of the diaphragm 21' is also the same as the diaphragm 21. A difference is that the diaphragm 21' is embodied so as to be belly-like or curved counter to the propagation direction 14, and is therefore also adapted to the curved shape of the front side 16 of the receiving optics 13.

The diaphragm 21' is also embodied essentially in the form of a trapezium or in the manner of a trapezium whose limbs 28', 29' can be linear or else curved. Like the diaphragm 21, the diaphragm 21' is also of tapered design in the direction of the transmitting unit 2. The intensity of the reception light beam 18 of the receiving element 11 is therefore reduced to a greater degree than the intensity of the reception light beams 19, 20 of the further receiving elements 9, 10.

The invention claimed is:

1. An optoelectronic sensor device for a motor vehicle for detecting objects located in the surroundings of the motor vehicle, comprising:
    a transmitting unit for emitting an optical transmission signal;
    a receiving unit for receiving a reception signal which is the transmission signal reflected by an object, wherein the receiving unit has at least two receiving elements which are arranged distributed along a distribution direction, and receiving optics comprising a receiving lens which is positioned ahead of the receiving elements in the propagation direction of the reception signal;
    a securing device for securing the receiving optics; and
    a diaphragm for reducing the intensity of the reception signal, wherein the diaphragm is secured to the securing device, wherein the diaphragm is of elongate form and extends along the distribution direction of the receiving elements, and
    wherein the diaphragm is arranged centrally in relation to the receiving optics in the perpendicular direction with respect to the distribution direction of the receiving elements and perpendicularly with respect to the propagation direction of the reception signal.

2. The sensor device according to claim 1, wherein the diaphragm is an inherently rigid element.

3. The sensor device according to claim 1, wherein the diaphragm is embodied in one piece with the securing device.

4. The sensor device according to claim 1, wherein the diaphragm has a securing function for the receiving optics, with the result that the receiving optics are secured at least in a supporting fashion by the diaphragm.

5. The sensor device according to claim 1, wherein the diaphragm tapers in the distribution direction of one of the at least two receiving elements which is positioned closest with respect to the transmitting unit.

6. The sensor device according to claim 1, wherein the diaphragm is embodied in the manner of a trapezium with straight or curved limbs.

7. The sensor device according to claim 1, wherein the diaphragm is formed from a material which is non-transparent, or has a defined partial transparency, with respect to the optical reception signal.

8. The sensor device according to claim 1, wherein the securing device has a frame for holding the receiving optics, and the diaphragm spans two opposite sides of the frame.

9. The sensor device according to claim 8, wherein the diaphragm is located in a common plane with the sides of the frame.

10. The sensor device according to claim 8, wherein the diaphragm is embodied as a spring element which presses the receiving optics against the frame.

* * * * *